(12) United States Patent
Wright

(10) Patent No.: US 11,828,770 B2
(45) Date of Patent: Nov. 28, 2023

(54) THERMAL SURROGATE FOR A DATA STORAGE DEVICE

(71) Applicant: Western Digital Technologies, Inc., San Jose, CA (US)

(72) Inventor: David Wright, San Tan Valley, AZ (US)

(73) Assignee: Western Digital Technologies, Inc., San Jose, CA (US)

( * ) Notice: Subject to any disclaimer, the term of this patent is extended or adjusted under 35 U.S.C. 154(b) by 169 days.

(21) Appl. No.: 17/539,807

(22) Filed: Dec. 1, 2021

(65) Prior Publication Data

US 2023/0168269 A1  Jun. 1, 2023

(51) Int. Cl.
*G01P 5/00* (2006.01)

(52) U.S. Cl.
CPC ....................................... *G01P 5/00* (2013.01)

(58) Field of Classification Search
CPC ........ G01P 5/00; G06F 3/0655; G06F 3/0604; G06F 3/0676; G06F 3/0679; G06F 3/067
See application file for complete search history.

(56) References Cited

U.S. PATENT DOCUMENTS

| 7,535,711 | B2 * | 5/2009 | Saegusa | G01P 13/006 353/57 |
| 9,875,773 | B1 | 1/2018 | Waters et al. | |
| 9,904,336 | B1 * | 2/2018 | Khan | H05K 7/20172 |
| 2014/0316720 | A1 * | 10/2014 | Dumontier | G01F 1/00 702/45 |
| 2022/0214829 | A1 * | 7/2022 | Bhullar | G06F 3/0634 |

* cited by examiner

*Primary Examiner* — Francis C Gray
(74) *Attorney, Agent, or Firm* — Michael Best & Friedrich LLP

(57) ABSTRACT

A thermal surrogate device is configured to replace a data storage device within a server or other multiple data storage device system. The thermal surrogate device has a housing that has a form factor identical to the data storage device. The housing has a cavity along a length, and a sensor fixture is positioned within the housing. An airflow sensor is attached to the sensor fixture and configured to measure an airflow through the housing. The housing is configured to be installed within a slot for a data storage device in a multiple memory system.

20 Claims, 6 Drawing Sheets

THERMAL SURROGATE FOR A DATA STORAGE DEVICE

BACKGROUND

This application relates generally to thermal management equipment for servers or other systems including multiple solid-state data storage devices, and specifically to thermal surrogates for solid state data storage devices within a server-based system.

Information management systems ("IMS") or servers for enterprise uses generally consist of a chassis system with multiple slots to accept data storage devices, such as solid-state drives ("SSDs"). As the form factors of data storage devices change, so does the chassis systems which house the data storage devices. Generally, air movers, such as static pressure fans, inside the chassis system facilitate moving air across the multiple slots, and therefore across the data storage devices positioned within the slots to provide cooling. However, due to varying data storage device form factor changes, it can be difficult to understand or verify the airflow across the various data storage devices, and therefore understand the cooling effectiveness of the IMS or server in general. Airflow sensors located within the chassis system may not be sufficient to fully determine the airflow within the chassis system due to restraints on where the devices may be positioned.

SUMMARY

Increases in the density of data storage devices within an IMS and/or server along with varying form factors of the data storage devices themselves can result in difficulties in fully understanding the airflow across the data storage devices, and therefore cooling characteristics of the data storage devices within a chassis of the IMS and/or server. By using thermal surrogates within the chassis to monitor airflow across a data storage device replaced by the surrogate, a more thorough understanding of the airflow across specific data storage devices within the chassis system can be determined.

One embodiment of the present disclosure includes a thermal device. The thermal device includes a housing having a form factor of a data storage device and a cavity along an entire length of the housing. The thermal device further includes a sensor fixture positioned within the cavity of the housing and an airflow sensor attached to the sensor fixture and configured to measure an airflow through the housing. The housing is configured to be installed within a slot for the data storage device in a multiple data storage device system.

Another embodiment of the present disclosure includes a method for measuring airflow at a data storage device within a multiple data storage device system. The method includes selecting a thermal surrogate housing based on the form factor as the data storage device. The method further includes installing an airflow sensor on a sensor fixture within the housing and installing the housing within a slot of the multiple data storage device system associated with the data storage device. The method also includes monitoring an airflow through the housing and outputting the monitored airflow data to an external device.

Another embodiment of the present disclosure includes a surrogate device for replacing a data storage device within a multiple data storage device system. The surrogate device includes a housing having a form factor of the data storage device and a cavity along a length of the housing. The surrogate device further includes a sensor fixture positioned within the cavity of the housing, and the surrogate device includes a plurality of mounting points positioned along a length of the sensor fixture. The surrogate device also includes an airflow sensor coupled to one of the number of mounting points and configured to measure an airflow through the housing.

Various aspects of the present disclosure provide for improvements in data storage device systems, such as servers. For example, improving an understanding of airflow across data storage devices can allow system developers and/or end users to optimize their systems to improve device lifespan and efficiency. The present disclosure can be embodied in various forms. The foregoing summary is intended solely to give a general idea of various aspects of the present disclosure and does not limit the scope of the present disclosure in any way.

DETAILED DESCRIPTION

In the following description, numerous details are set forth, such as data storage device configurations, and the like, in order to provide an understanding of one or more aspects of the present disclosure. It will be readily apparent to one skilled in the art that these specific details are merely exemplary and not intended to limit the scope of this application. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, etc. Those of skill in the art also will realize that although the disclosure refers to a surrogate device for data storage devices within a server or other multiple memory system, the concepts described herein also apply to surrogate devices for other devices within a server or other system.

Figure 1:
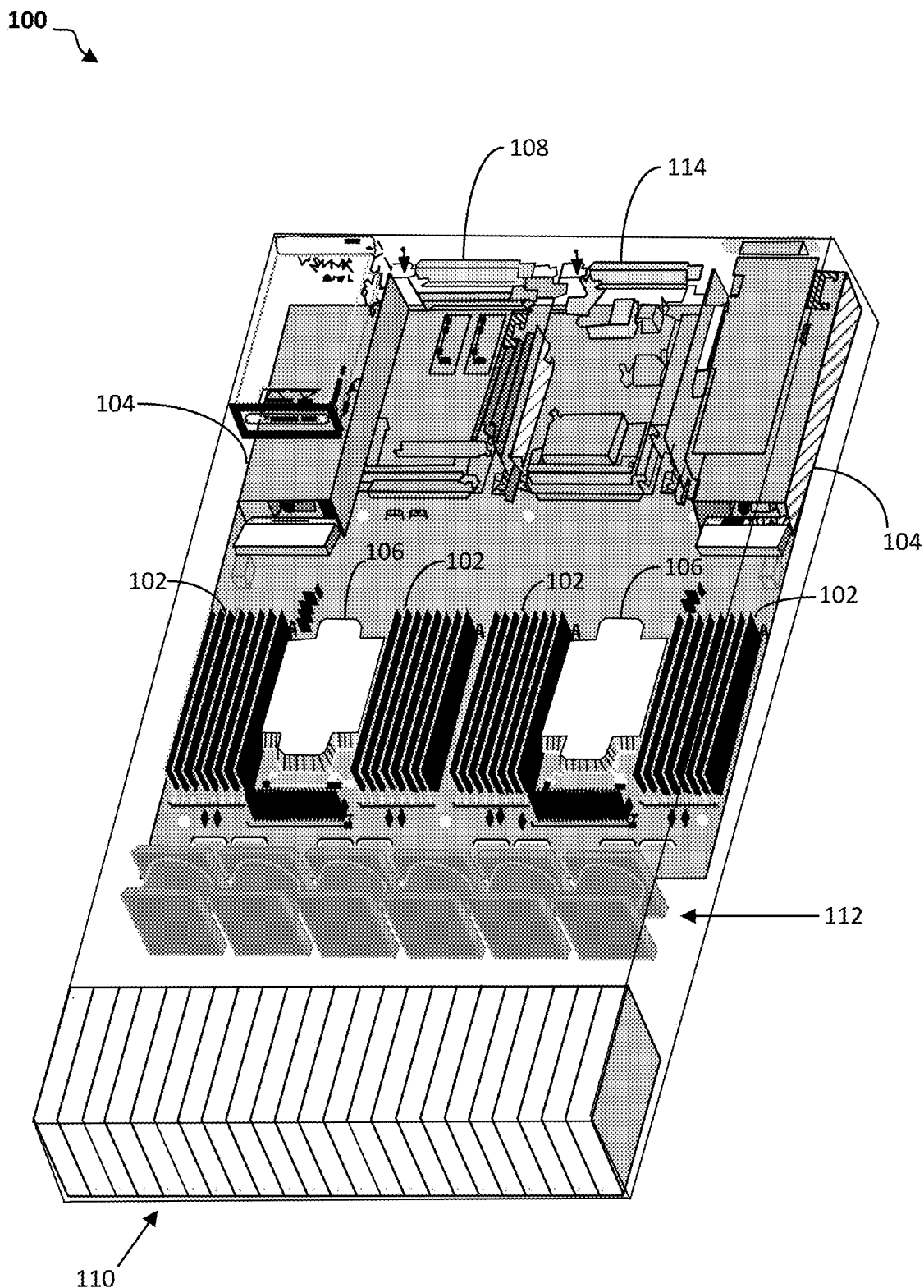
FIG. 1 is a system view of an exemplary server system 100, according to some embodiments.

FIG. 1 is a system view of an exemplary server system 100, according to some embodiments. While the system 100 is described as a server system, it is understood that the system 100 may be an IMS system, or other system type which includes multiple data storage devices. Additionally, the server system 100 is understood to be an example diagram of a server system, and that the layout, dimensions, components, functions, etc. are for illustrative purposes only. The thermal surrogate devices described in more detail below are configured to work with various server systems and should not be limited to the server system 100 described below.

The server system 100 is shown to include one or more system data storage devices 102, one or more power supplies 104, one or more processors 106, one or more graphic processors 108, one or more data storage devices 110, one or more cooling fans 112, and one or more communication devices 114, such as network interface devices. In one example, various information may be provided to, or requested from the one or more data storage devices 110 via the communication device 116. The request for retrieval of data from the data storage devices 110 and/or the storage of data to the data storage devices 110 may be processed by the one or more processors 106. Generally, the server system 100 works as a general server system as required for a given application.

In one embodiment, the data storage devices 110 are solid-state drives ("SSD"), such as non-volatile NAND SSDs. However, other SSD types are also contemplated. Additionally, in other examples, the data storage devices 110 may be other data storage devices, such as hard-disk drives ("HDD"). The cooling fans 112 are configured to direct (e.g., push) air towards the one or more data storage devices 110. However, in other examples, the cooling fans 112 may be configured to direct air away from the data storage devices 110, resulting in air flow being pulled across the data storage devices 110 in a direction away from the data storage devices 110. While the server system 100 is shown with six cooling fans 112, it is understood that more than six cooling fans 112 or less than six cooling fans 112 may be used as required for a given application.

Figure 2:
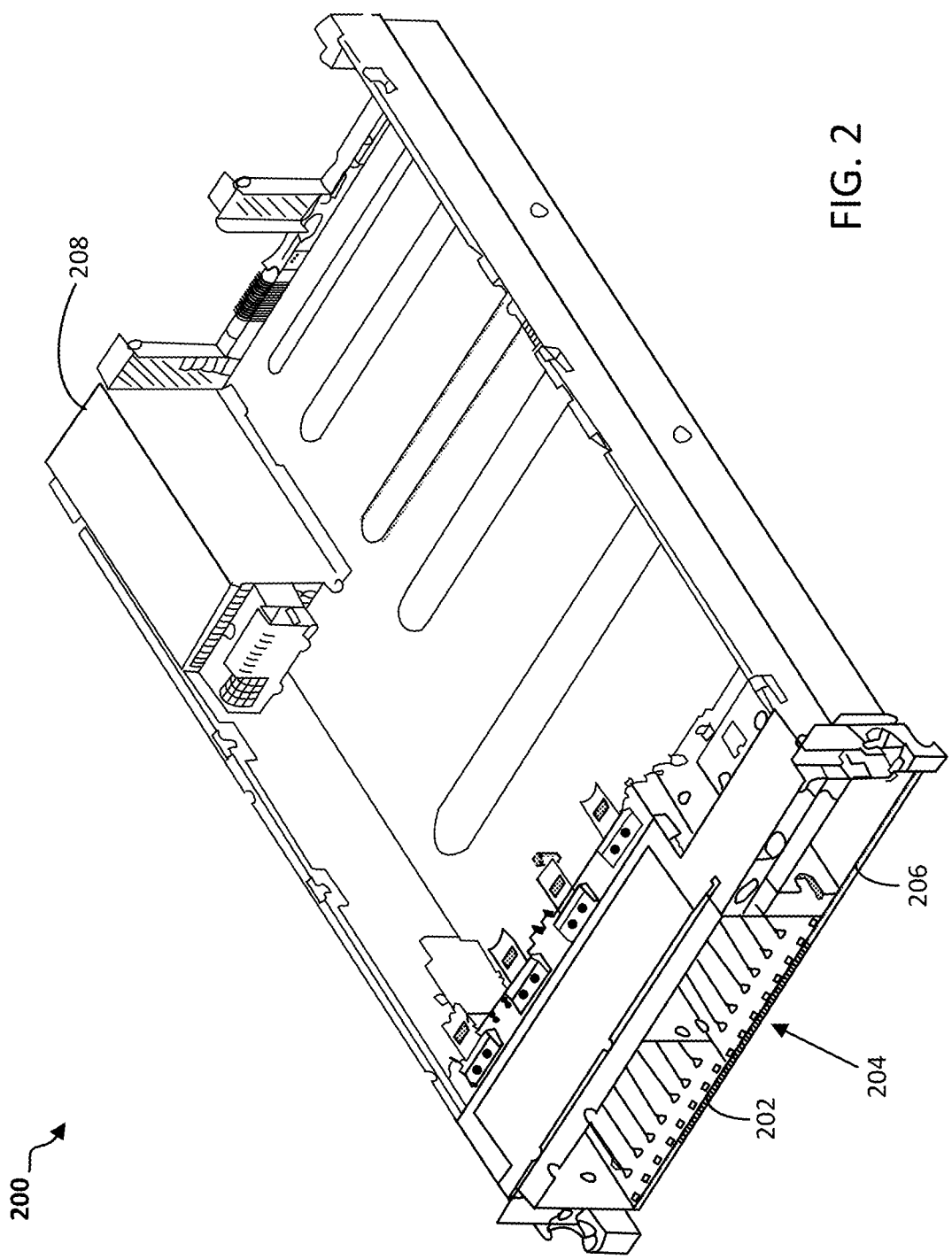
FIG. 2 is a perspective view of a chassis of the server system of FIG. 1, according to some embodiments.

Turning now to FIG. 2, a chassis 200 of a server system, such as server system 100 is shown, according to some embodiments. The chassis 200 includes a number of slots 202 within a drive rack 204 configured to receive data storage devices, such as data storage devices 110 described above. While referred to herein as "slots," the slots 202 may also be referred to as drive bays. In some embodiments, the slots 202 are configured to receive SSDs of a specific form factor. For example, the SSDs configured to be received in the slots 202 may be enterprise and data center form factor ("EDSFF") drives. However, other data storage device 110 form factors may also be used as appropriate for a given application. The chassis 200 may further include additional bays 206 to receive other devices, such as network cards, add-in cards, computational accelerators, and/or other devices as required for a given application. The chassis 200 may further include a housing 208 for a power supply, such as power supply 104 described above.

In a general server system, such as server system 100, it may be difficult to understand and/or verify airflow across the one or more data storage devices 110. Specifically, due to the airflow within the chassis 200, impact of additional devices, form factors of the data storage device 110, and/or other variables can alter airflow through individual data storage devices 110. Furthermore, there are limited locations to place sensors (e.g., airflow sensors) that would be representative of airflow across the data storage devices 110. Additionally, while a total airflow through the chassis 200 may be able to be measured or calculated based on factors, such as the rating of the cooling fans 112, the airflow across an individual data storage device 110 is not easily determined. This can result in some data storage devices 110 getting sufficient airflow, while other data storage devices 110 may not receive sufficient airflow, resulting in overheating, reduced lifespan, reduced performance, etc.

Figure 3:
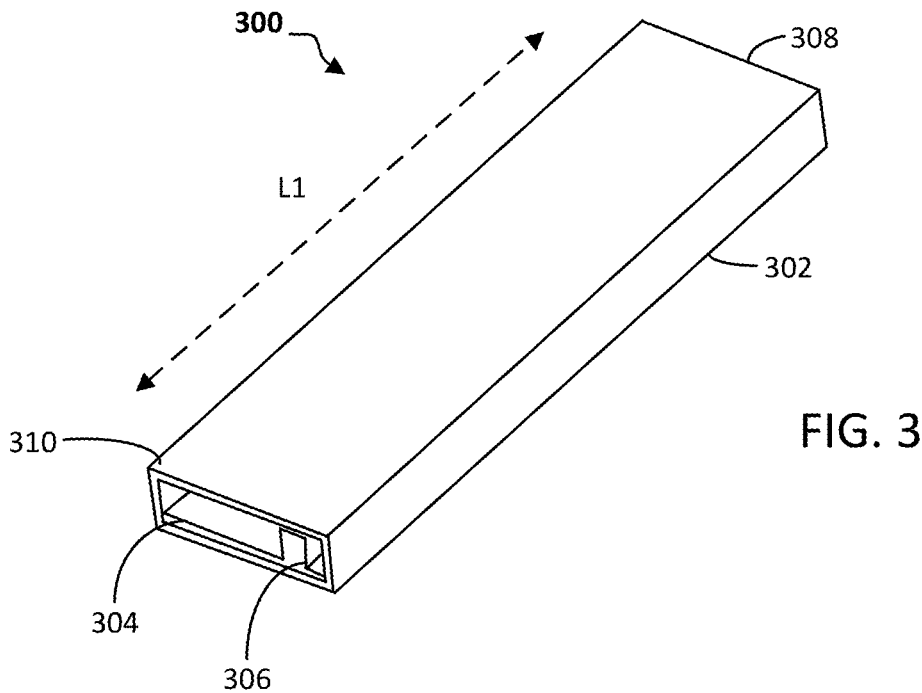
FIG. 3 is a perspective view of a thermal surrogate device, according to some embodiments.

Turning now to FIG. 3, a thermal surrogate device 300 is shown, according to some embodiments. As will be described in more detail below, the thermal surrogate device 300 is configured to replace a data storage device, such as data storage device 110, within a server, such as server 100. The surrogate device 300 may be constructed to have the same form factor as a data storage device, such as data storage device 110, described above. For example, the surrogate device 300 may have a housing 302 that is the same shape as a body of a data storage device, such as data storage device 110. For example, the housing 302 may have the same form factor as an EDSFF device. In one embodiment, the housing 302 may be formed into a 9.5 mm E1.S EDSFF device. In other examples, the housing 302 may be formed into other EDSFF device sizes, such as a 15 mm E1.S device, a 25 mm E1.S device, a 9.5 mm E1.L device, an 18 mm E1.L device, a 7.5 mm E3.L device, a 16.8 mm E3.L device, a 7.5 mm E3.S device, and/or a 7.5 mm E3.S device. However, it is understood that the housing 302 may also be formed into other data storage device form factors, as required for a given application. In one embodiment, the thermal surrogate device 300 is configured to be directly swappable with a data storage device 110 of a server 100, such that the thermal surrogate device 300 can be swapped with a data storage device within a server 100, and vice versa.

The thermal surrogate device 300 may further include a sensor fixture 304 positioned within a cavity 306 within the housing 302. The cavity 306 extends the length of the surrogate device 300 such that air may flow from a first end 308 of the thermal surrogate device 300 to a second end 310 of the thermal surrogate device. For example, when installed into a server, such as server 100, the first end 308 may be positioned towards an interior of the server such that airflow provided by cooling fans, such as cooling fans 112, is directed through the first end 308 of the cavity 306 towards the second end 310 of the cavity 306. In one embodiment, the cavity 306 is open at both ends of the housing 208 such that restriction of the airflow through the housing 302 is reduced. However, in some examples, grates, screens, or other devices may be placed over one or both ends of the cavity 306 to restrict airflow though the housing 302. For example, the airflow may be restricted to better model airflow through a data storage device 110.

In some embodiments, the sensor fixture 304 is slidably positionable within the housing 302 such that the sensor fixture 304 may be removed and installed within the housing 302. This can allow for components, such as an airflow sensor as described below, to be installed or replaced without having to disassemble the housing 302.

Figure 4:
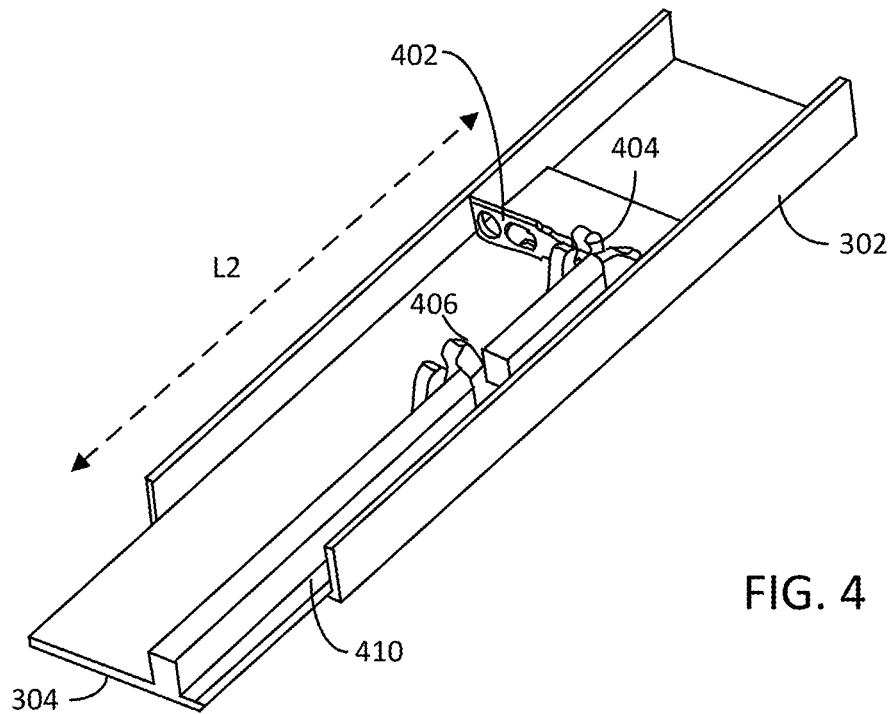
FIG. 4 is an internal view of the thermal surrogate device of FIG. 3, according to some embodiments.

Turning to FIG. 4, an interior view of the thermal surrogate device 300 is shown, according to some embodiments. As shown in FIG. 4, the sensor fixture 304 may be slidably positionable within the housing 302. The sensor fixture 304 may include at least one airflow sensor 402. For example, the airflow sensor 402 may be a volume air flow sensor, a mass airflow sensor, a differential airflow sensor, and/or other airflow sensor types as required for a given application. As shown in FIG. 4, the airflow sensor 402 is positioned to be perpendicular to the length (L1) of the housing 302 to ensure the air flows though the sensor 402. While the example of FIG. 4 shows only a single airflow sensor 402, it is contemplated that additional airflow sensors 402, as well as other sensors, such as temperature sensors, air speed sensors, vibration sensors, acoustic sensors, and/or other sensors required for a given application, may also be located within the housing 302.

The sensor fixture 304 further includes two or more mounting points 404, 406 for mounting the airflow sensor 402 to the sensor fixture 304. By including multiple mounting points 404, 406, the airflow sensor 402 may be positioned on the sensor fixture 304 to allow for airflow at different points within the thermal surrogate device 300 to be determined. A wire 408 or other connection mechanism (e.g., cable) of the airflow sensor 402 may be routed out of the housing 302 at the second end 310 through a channel 410. Routing the wire 408 though the channel 410 prevents or reduces the impact of the wire 408 on the airflow through the cavity 306. For example, the channel 410 may be approximately 10% of the total size of the cavity 306. However, in other embodiments, the channel 410 may be more than 10% of the total size of the cavity 306 or less than 10% of the total size of the cavity 306. In one example, the mounting points 404, 406 are positioned along a length (L2) of the sensor fixture 304. However, in other embodiments, the mounting points 404, 406 may be offset along a width of sensor fixture 304.

Figure 5:
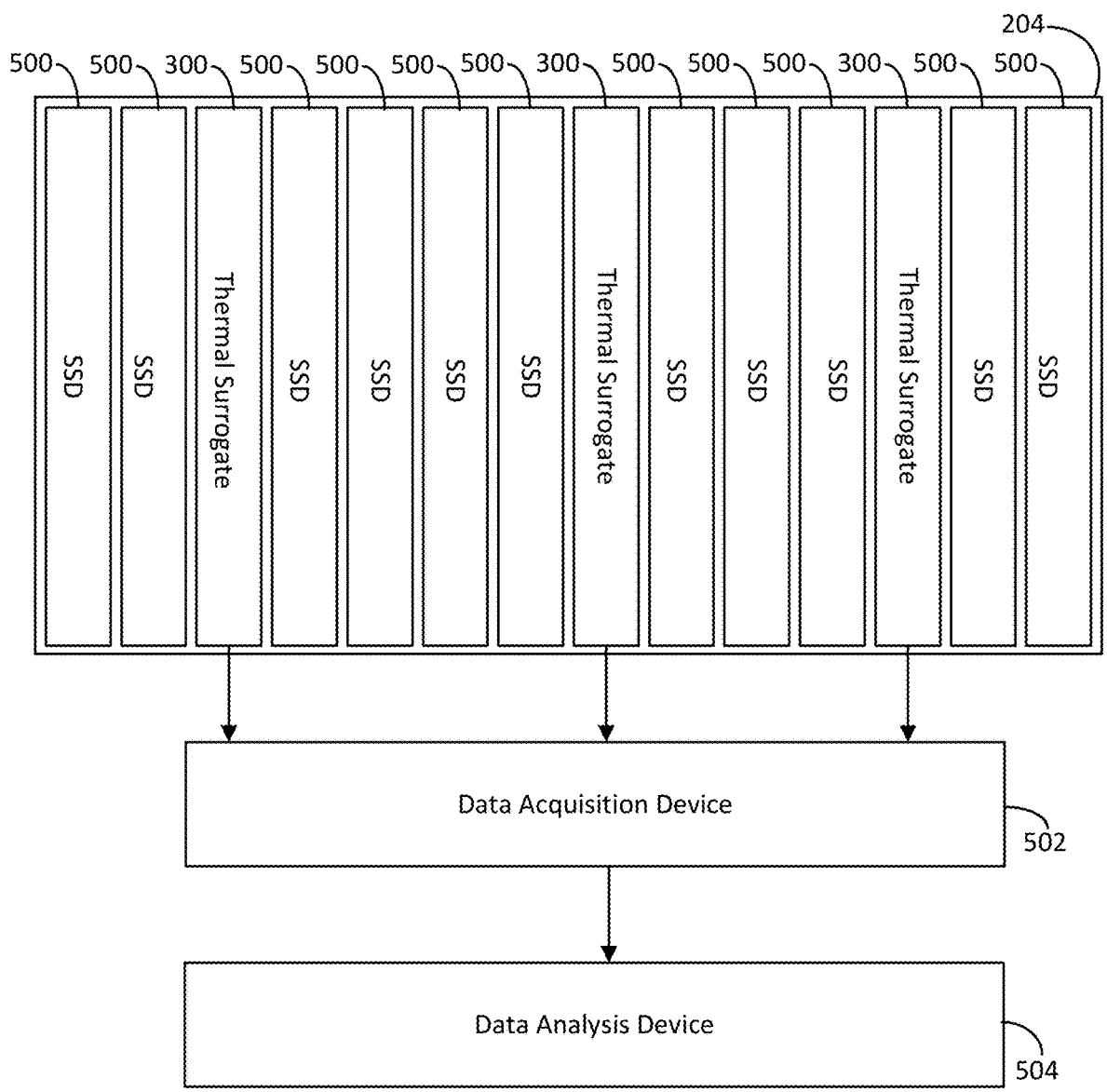
FIG. 5 is a front view of a drive rack of a server, according to some embodiments.

Turning now to FIG. 5, a front view of a drive rack, such as drive rack 204, is shown according to some embodiments. The drive rack 204 is shown as having slots for accommodating fourteen devices. As shown in FIG. 5, eleven of the slots are occupied by solid state drives 500. While described as SSDs 500, it is contemplated that other data storage devices may be installed within the drive rack. The drive rack 204 further includes three thermal surrogate devices 300. However, while the drive rack 204 shows three thermal surrogate devices 300, the drive rack 204 may include more than three thermal surrogate devices 300 or fewer than three thermal surrogate devices 300. The number and placement of thermal surrogate device 300 is determined by a user when trying to obtain thermal data within a server, such as server 100. As the thermal surrogate devices 300 are configured to be swappable with the SSDs 500, the location and quantity of thermal surrogate devices within the drive rack 204 are easily modified based on the needs of the user.

The thermal surrogate devices 300 are coupled, such as via the wire 408, to a data acquisition device 502. For example, the wire 408 may provide data from the airflow sensor 402 to the data acquisition device 502. The data acquisition device 502 may be a multiple input data acquisition device. The data acquisition device 502 is coupled to a data analysis device 504, which can analyze the data from each of the thermal surrogate devices 300. In one embodiment, the data analysis device 504 is a personal computer; however, other data analysis devices, such as dedicated data analysis devices are also contemplated. While shown as separate devices in FIG. 5, it is contemplated that in some embodiments, the data acquisition device 502 and the data analysis device 504 may be combined into a single device.

The data analysis device 504 may be configured to provide various data analysis of the airflow data to allow for improvement or modifications to a given server, such as server 100. For examples, the airflow data may be analyzed to allow for custom thermal throttling scripts or other programs to be generated for one or more data storage devices 100 within a server. In other examples, potential differences between the airflow of the server 100 and one or more data storage devices 100 thermal response can be identified, along with modeling potential solutions to address the identified differences. In other examples, thermal profiles for a system in manufacturing and development may be defined to identify potential problematic areas. This may allow for faster time-to-market qualifications as the thermal capabilities of an end-user's system at an individual data storage device 110 level may be known. Further, by allowing for thermal analysis at an individual data storage device 110 level, airflow data for all or some of the data storage devices 110 with a server 100 may be modeled.

Figure 6:
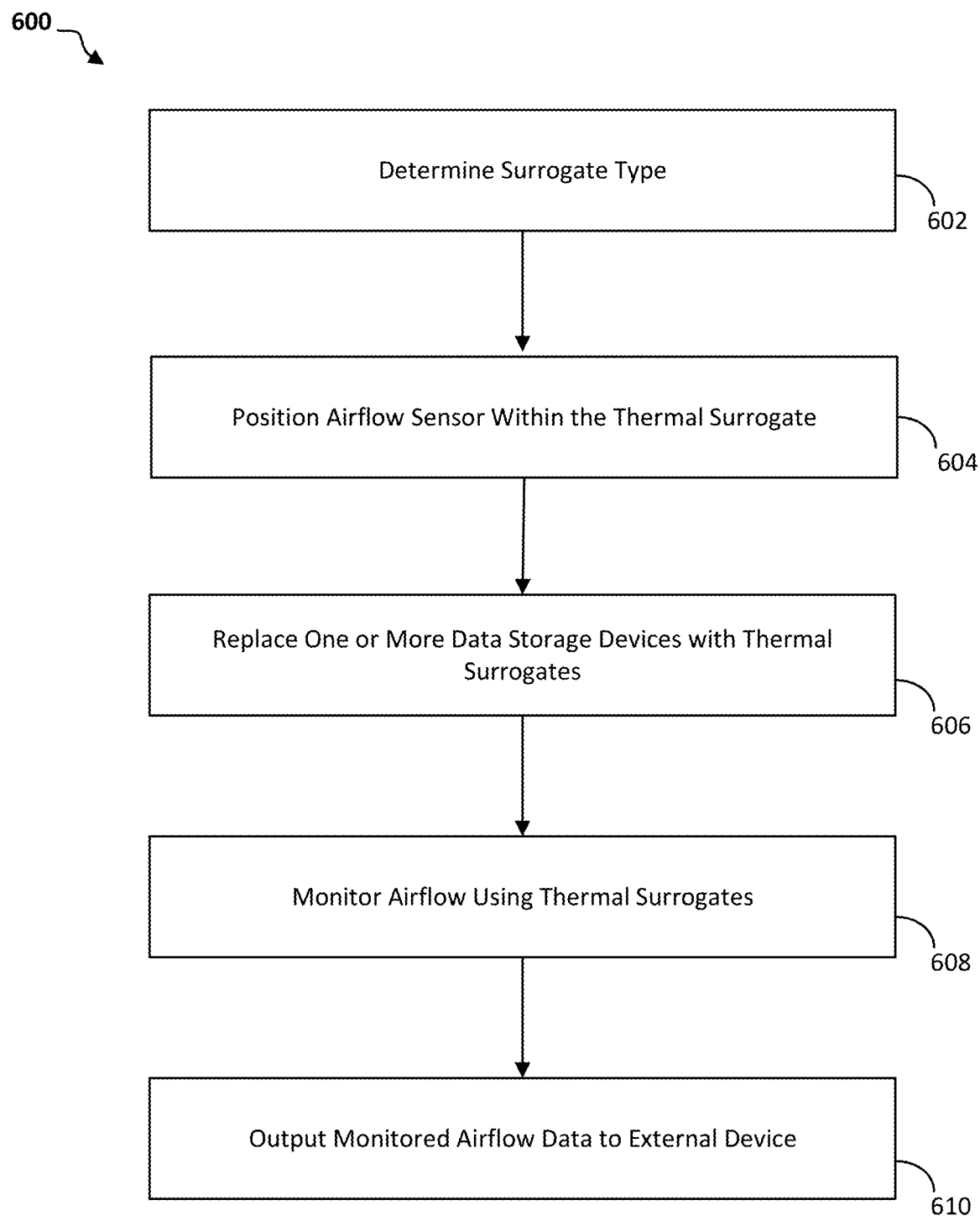
FIG. 6 is a flow chart illustrating a process for monitoring airflow for a single data storage device, according to some embodiments.

Turning now to FIG. 6, a process 600 for monitoring airflow for a single data storage device, such as data storage device 110, within a server is shown, according to some embodiments. At process block 602, the thermal surrogate form factor is determined. In one embodiment, the thermal surrogate form factor is determined based on a form factor of the data storage device 110 that the thermal surrogate device 300 will be replacing.

At process block 604, the air flow sensor 402 is positioned within the thermal surrogate device 300. As described above, the air flow sensor 402 may be placed in various positions within the thermal surrogate device 300 using the one or more mounting points 404, 406. In some embodiments, the position of the air flow sensor 402 may be based on various factors, such as the position of fans within the server, the placement of components within the server, whether the airflow is pushed or pulled through the thermal surrogate device 300, etc.

At process block 606, a data storage device 110 within a server is replaced with the thermal surrogate device 300. As described above, in some examples multiple data storage devices 110 may be replaced with thermal surrogate devices 300. As the thermal surrogate devices 300 have the same form factor as the data storage devices 110, the data storage devices 110 may be directly replaced with the thermal surrogate devices 300 having the corresponding form factor. Upon installation of the thermal surrogate devices 300, the airflow through the thermal surrogate devices 300 is monitored via the air flow sensor 402 within the thermal surrogate devices 300 at process block 608, as described above. While the process 600 is described with respect to monitoring airflow, in some examples, additional parameters, such as air speed, temperature, etc. may also be monitored.

At process block 610, the monitored airflow is output to an external device, such as data acquisition device 502, described above.

Figure 7:
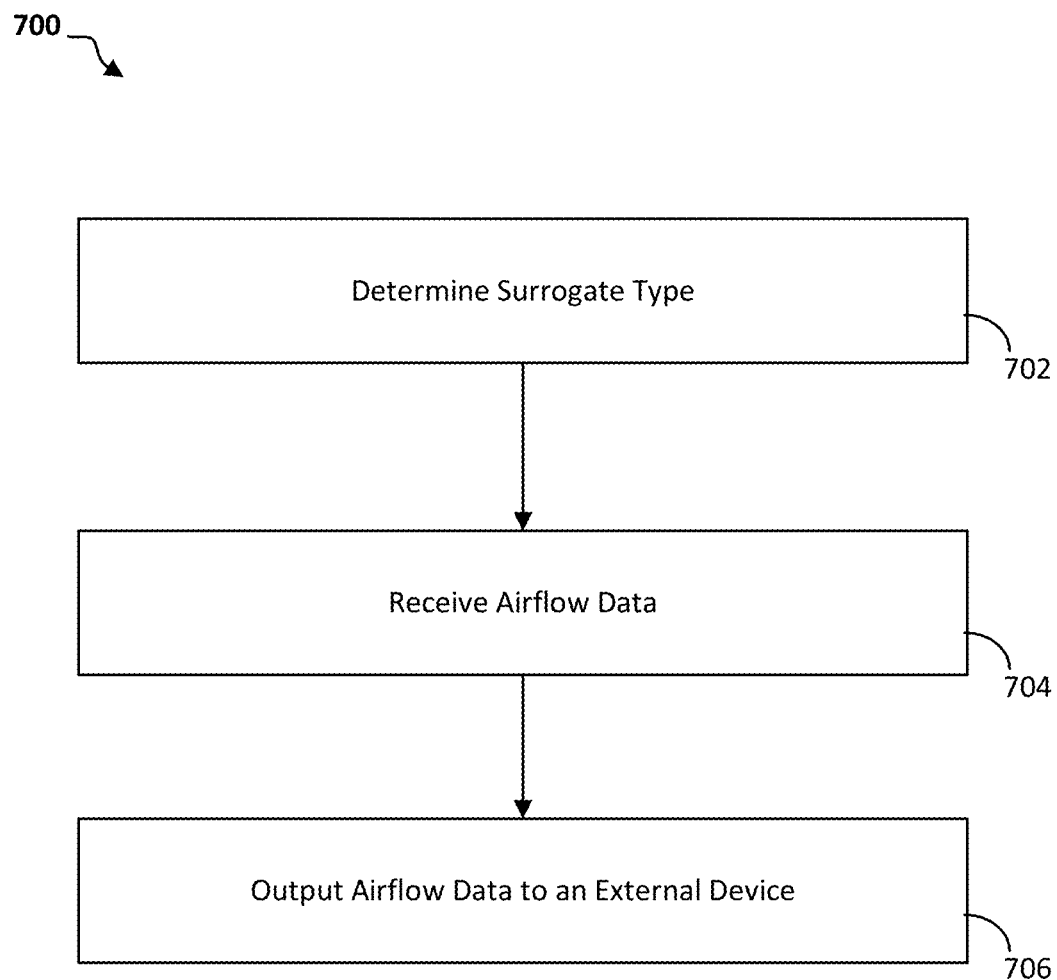
FIG. 7 is a flow chart illustrating a process for monitoring airflow at a computing device, according to some embodiments.

Turning now to FIG. 7, a process 700 for measuring airflow at one or more data storage devices, such as data storage devices 110, at a computing device is shown, according to some embodiments. In one embodiment, the computing device may be the data acquisition device 502, described above. However, the computing device may be other computing devices configured to acquire data form one or more thermal surrogate devices 300, as required for a given application. At process block 702 the computing device determines a thermal surrogate device type. In one embodiment, the thermal surrogate device type represents a form factor of the thermal surrogate device 300 that corresponds to a data storage device 110 within a server 100. In some examples, the computing device may determine the thermal surrogate device type based on one or more inputs, such as a bar code or other identifying marking (e.g., QR code, machine readable text, etc.) and/or electronic data provided by the thermal surrogate device 300, such as via near field communication ("NFC"), Bluetooth, and/or other electronic transmitter. In some embodiments a user may enter one or more data values into the computing system to allow the computing system to determine the thermal surrogate device type, such as a serial number, a device type, etc.

Upon determining the thermal surrogate type, the computing device is then configured to receive airflow data from the thermal surrogate device 300. In one embodiment, the airflow data is received from the airflow sensor 402 within the thermal surrogate device 300. For example, the airflow sensor 402 may be configured to output an electronic signal corresponding to a detected airflow, such as 0-5 VDC, 4-20 mA, etc. Upon receiving the airflow data, the computing device is configured to output the data to an external device. In one embodiment, the external device may be data analysis device 504, described above. However, in other embodiments the external device may be one or more computing devices coupled to the data acquisition device 502. The computing device may output the airflow data to the external devices using various communication protocols at process block 706. In one example, the computing device may output the airflow data to the external devices using various wireless communication protocols, such as Bluetooth, Bluetooth Low Energy, Wi-Fi, Cellular, or other wireless protocol as required for a given application. In other examples, the computing device may output the airflow data to the external devices using various wired communication protocols, such as USB, USB 2.0, Serial (e.g., RS-232), Firewire, LAN, Internet (e.g. CAT5), or other wired communication protocol as required for a given application. The With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A thermal device, comprising:
    a housing having a form factor of a data storage device and a cavity along an entire length of the housing;
    a sensor fixture positioned within the cavity of the housing; and
    an airflow sensor attached to the sensor fixture and configured to measure an airflow through the housing, wherein the housing is configured to be installed within a slot for the data storage device in a multiple data storage device system.

2. The thermal device of claim 1, wherein the sensor fixture comprises a plurality of mounting points to mount the airflow sensor.

3. The thermal device of claim 2, wherein the plurality of mounting points are positioned along a length of the sensor fixture.

4. The thermal device of claim 1, wherein the housing has an enterprise and data center form factor (EDFF).

5. The thermal device of claim 1, wherein the data storage device is a solid-state drive.

6. The thermal device of claim 1, wherein the sensor is positioned perpendicular to the length of the housing.

7. The thermal device of claim 1, wherein the cavity extends the entire length of the housing to allow airflow through the housing.

8. The thermal device of claim 1, wherein the airflow sensor is one of a volume airflow sensor or a mass airflow sensor.

9. The thermal device of claim 1, wherein the sensor fixture is slidably positionable within the housing.

10. A method for measuring airflow at a data storage device, the method comprising:
    determining, with an electronic processor, a type of a thermal surrogate installed in a housing of a multiple data storage device system;
    receiving, with the electronic processor, airflow data from the thermal surrogate, the airflow data indicating a portion of an airflow through the housing; and
    outputting the airflow data that is received to an external device.

11. The method of claim 10, wherein the multiple data storage device system is a server.

12. The method of claim 10, wherein the thermal surrogate housing has an enterprise and data center form factor (EDFF).

13. The method of claim 10, wherein the sensor fixture comprises a plurality of mounting points for installing the airflow sensor.

14. The method of claim 10, wherein the airflow sensor is one of a volume airflow sensor and a mass airflow sensor.

15. The method of claim 10, wherein sensor fixture is slidably positionable within housing.

16. A thermal surrogate device comprising:
    a housing having a form factor of a data storage device and a cavity along a length of the housing;
    a sensor fixture positioned within the cavity of the housing, the sensor fixture including a plurality of mounting points positioned along a length of the sensor fixture; and
    an airflow sensor coupled to one of the plurality of mounting points and configured to measure an airflow through the housing.

17. The thermal surrogate device of claim 16, wherein the housing has an enterprise and data center form factor (EDFF).

18. The thermal surrogate device of claim 16, wherein the sensor fixture is slidably positionable within the housing.

19. The thermal surrogate device of claim 16, wherein the airflow sensor is one of a volume airflow sensor or a mass airflow sensor.

20. The thermal surrogate device of claim 16, wherein the airflow sensor is positioned perpendicular to the length of the housing.

* * * * *